United States Patent [19]
Queen

[11] 4,122,507
[45] Oct. 24, 1978

[54] LOUDSPEAKER OVERLOAD CIRCUIT

[75] Inventor: Daniel L. Queen, Chicago, Ill.

[73] Assignee: Chamberlain Manufacturing Corporation, Elmhurst, Ill.

[21] Appl. No.: 796,393

[22] Filed: May 12, 1977

[51] Int. Cl.² ............................................. H02H 3/08
[52] U.S. Cl. ...................................... 361/94; 361/58; 330/207 P; 335/153
[58] Field of Search ...................... 361/94, 93, 98, 58, 361/89; 179/1 A, 1 SW, 1 VC, 1 VL; 330/207 P; 335/153

[56] References Cited
U.S. PATENT DOCUMENTS

| | | | |
|---|---|---|---|
| 3,441,799 | 4/1969 | Delafrange et al. | 361/93 |
| 3,646,397 | 2/1972 | Ruthenberg et al. | 330/207 P X |
| 3,890,465 | 6/1975 | Kaizu | 330/207 P X |
| 3,925,708 | 12/1975 | Picciochi | 330/207 P X |

*Primary Examiner*—Patrick R. Salce
*Attorney, Agent, or Firm*—Hill, Gross, Simpson, Van Santen, Steadman, Chiara & Simpson

[57] ABSTRACT

An overload circuit for a loudspeaker system which indicates the overload and also automatically reduces the load on the speaker system to prevent damage in which a rectifier followed by a smoothing circuit is connected in parallel with the speaker and supplies an output to a magnetic coil for energizing a magnetic switch on overload so as to place a load dropping means in series with the speaker during overload. The load dropping means might be a lamp which visually indicates the overload condition.

6 Claims, 2 Drawing Figures

LOUDSPEAKER OVERLOAD CIRCUIT

BACKGROUND OF THE INVENTION

1. Field of the Invention

This invention relates in general to overload protection circuits and in particlar to an overload protection circuit for a speaker system.

2. Description of the Prior Art

Loudspeakers are subject to two principle types of overload. The first type is thermal overload during which continuous power is applied for sufficient time to allow excessive heat to build up in the voice coil of the loudspeaker causing it to be distorted and either to short itself or to rub against the side of the magnetic gap and, thus, become opened or shorted.

The second form of overload is caused when a signal produces excessive cone excursions distorting the motor assembly in a way which prevents it from returning to its normal position. The secondary result can be shorting or opening of the voice coil or simply freezing of the motion of the cone.

Failure in a speaker can also be caused by fatigue of the suspension members but this is normally the result of long term usage rather than accidental overload.

Since thermal overload is related to energy input rather than power input, it is desirable that any sensing circuit integrate the input power so that it is energized only when the energy input exceeds the energy output by a reference amount.

However, since excursion failure occurs at low frequencies and is a function of instantaneous power input, the sensing circuit must also be energized by excess intantaneous poor at low frequencies.

SUMMARY OF THE INVENTION

In the present invention, an overload circuit for a loudspeaker system provides a magnetic responsive switch in series with the speaker and a rectifying circuit connected across the input to the speaker with the rectified output supplied to a smoothing circuit which integrates the input power and supplies the integrated power to a magnetic coil which during overload produces sufficient magnetic flux to open the magnetic switch. When the magnetic switch opens, a dropping device such as a lamp is connected in series with the speaker to the input so as to drop the load on the speaker and simultaneously the lamp will be illuminated so as to visually indicate the overload condition such that such condition can be limited. Upon overload exceeding a predetermined time as determined by the life of the lamp at the applied volatage, the lamp filament will burn out thus opening the circuit to the speaker so as to protect the speaker from damage.

A modification of the invention replaces the magnetically operated switch with a solid state switching circuit that is energized by the output of the smoothing circuit connected to the output of the rectifer.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
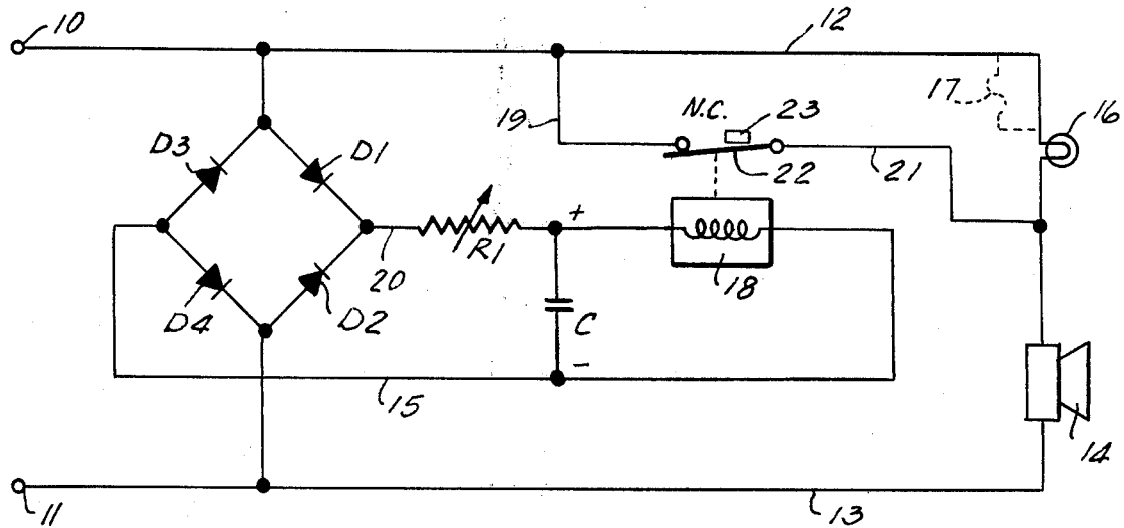
FIG. 1 is an electrical schematic diagram of the invention.

FIG. 1 illustrates a pair of input terminals 10 and 11 and terminal 11 is connected by lead 13 to one side of a loudspeaker 14 which has its other side connected to a lead 21 and through a normally closed magnetically operated switch 22 to a lead 19 that is connected to terminal 10. A permanent magnet 23 holds the normally closed switch 22 in the closed position and a magnetic coil 18 produces a magnetic flux when energized at a certain level which will open the switch contact 22. A capacitor C is connected in parallel with the coil 18. A diode rectifier comprising diodes D1, D2, D3 and D4 are connected across terminals 10 and 11 and supplies a negative output to lead 15 which is connected to the capacitor C and coil 18. The positive output of the rectifier is supplied to lead 20 which is connected to a resistor R1 which has its other side connected to the second side of the capacitor C and the coil 18.

A lead 12 is connected to input terminal 10 and to one side of a lamp 16 which has its other side connected to lead 21 and one side of the speaker 14. A fuse 17 may, if desired, also be in series with the lamp 16.

The lamp 16 should be mounted in the speaker enclosure which holds the speaker 14 such that it is visible through the grill cloth. Care should be taken that the method of mounting the lamp does not produce an audio leak in the cabinet which would deteriorate the audio characteristics of the speaker system.

In operation, if an overload condition is applied at terminals 10 and 11 and through the switch 22 to the speaker 14 for a sufficient time, the output of the rectifier appearing on terminals 15 and 20 will be integrated by the resistor R1 and the capacitor C and the coil 18 would receive sufficient current to produce a magnetic flux so as to open magnetic switch 22 thus disconnecting leads 19 and 21 such that the current path between terminals 10 and 11 passes through the lamp 16 and the speaker 14. This immediately drops the load on the speaker 14 since part of the input will be dissipated in the lamp 16. If such load continues for any finite time, the lamp 16 will be illuminated and will visually indicate such overload condition which can be observed so that corrective action can be taken, as for example, by turning down the gain of the amplifier supplying input terminals 10 and 11. Furthermore, the lamp 16 can be chosen such that it will carry an overload for only a predetermined time and can thus act as a fuse such that if the overload continues beyond said predetermined time, the filament lamp will burn out thus opening the circuit to the speaker 14 since an open circuit will exist between leads 12 and 13 as well as between leads 19 and 13. It is to be realized, of course, that a fuse 17 can also be placed in series with the speaker 14 and lamp 16 between leads 12 and 13 but if the lamp 16 is relatively inexpensive and is readily available the fuse would be unnecessary since the lamp itself can serve as a fuse.

In a particular circuit according to the invention, the coil 18 was formed of 1168 turns of AWG 40 copper wire wound on a bobbin and the lamp could be a type 93, type 94 or a type 1939.

During a test, the maximum lamp current was 1.8 amperes for the speaker when driven continuously from a 300 watt amplifier and at this current the type 93 and 94 lamp is rated to last 15 seconds with the volts in at terminals 10 and 11 being 50 volts. When the voltage was set at 40 volts input to the speaker system, the input current was about 1.6 amperes and the lamp life is 280 seconds and if a fuse 17 were to be used in the circuit a 1.6 ampere fuse would be suitable.

The capacitor C was chosen to be an electrolitic type which had a capacitive value between 50 and 85 microfarads. The series resistor R1 was about 50 ohms. The resistor R1 may also comprise an adustable potentiometer to allow the operating point of the coil 18 to be set to a desired value. The coil 18, contact 22 and a magnet 23 comprise a reed relay.

The attached data was taken and illustrates in column 1 the voltage applied to terminals 10 and 11. Column 2 lists the voltage across the speaker terminals, column 3 lists the power dissipated in the speaker 14, column 4 lists the DB drop and column 5 lists the current through the speaker.

| Column 1<br>Lamp Type 94<br>At Volts In | Column 2<br>Speaker E | Column 3<br>Speaker P | Column 4<br>DB Drop | Column 5<br>Current |
|---|---|---|---|---|
| 5.0 | 3.0 | 1.1 | −2.2 | 0.37 |
| 10. | 5.0 | 3.1 | −3.0 | 0.62 |
| 15. | 6.6 | 5.4 | −3.6 | 0.83 |
| 20. | 8.0 | 8.1 | −4.0 | 1.0 |
| 25. | 9.3 | 11. | −4.3 | 1.2 |
| 30. | 11. | 14. | −4.6 | 1.3 |
| 35. | 12. | 17. | −4.8 | 1.5 |
| 40. | 13. | 20. | −5.0 | 1.6 |
| 45. | 14. | 23. | −5.2 | 1.7 |
| 50. | 15. | 27. | −5.3 | 1.8 |

| Column 1<br>Lamp Type 1939<br>At Volts In | Column 2<br>Speaker E | Column 3<br>Speaker P | Column 4<br>DB Drop | Column 5<br>Current |
|---|---|---|---|---|
| 5.0 | 3.2 | 1.3 | −1.9 | 0.39 |
| 10. | 5.3 | 3.5 | −2.7 | 0.67 |
| 15. | 7.2 | 6.4 | −3.2 | 0.88 |
| 20. | 8.7 | 9.4 | −3.6 | 1.1 |
| 25. | 10. | 13. | −3.9 | 1.2 |
| 30. | 11. | 16. | −4.2 | 1.4 |
| 35. | 13. | 20. | −4.4 | 1.6 |
| 40. | 14. | 24. | −4.6 | 1.7 |
| 45. | 15. | 28. | −4.8 | 1.9 |
| 50. | 16. | 32. | −4.9 | 2.0 |

In the present invention, I assume essentially resistive impedance in the loudspeaker system which assumption assures the worse case is used and by integrating the rectified input voltage and operating a triggering device such as the reed switch which operates at a chosen level.

Because cone excursion decreases with frequency, excessive excursions could occur at voltages which would not be activated by the thermal limit trigger, however the circuit of the invention, the capacitor C was chosen to be too small to integrate at low frequencies so that the current in the coil substantially follows the instantaneous voltage input at such low frequencies. Since the instantaneous current can exceed the average current by a factor of $\pi/2$, 4dB higher sensitivity can be obtained at low frequencies than at high frequencies provided those frequencies are low enough that the triggering device such as a reed relay can allow the instantaneous voltage. This condition is obtained when Reed relays having operating times of 2 or 3 milliseconds, are used. At frequencies below 100 Hz where excursion failures can occur, the relay will lag the instantaneous voltage by less than 10% of the wave length.

Thus, the same circuit provides separate control of thermal and excursion overload and 2½ times the power may be applied at high frequencies. When the reed relay opens, the overload is relieved and the shunning of the switch with a compression device such as an incandescent lamp prevents, audible distortion as the switch opens and closes. The resistance of the incandescent lamp element increases as the voltage across it increases thereby providing current regulation as well as visual indication of the overload.

Figure 2:
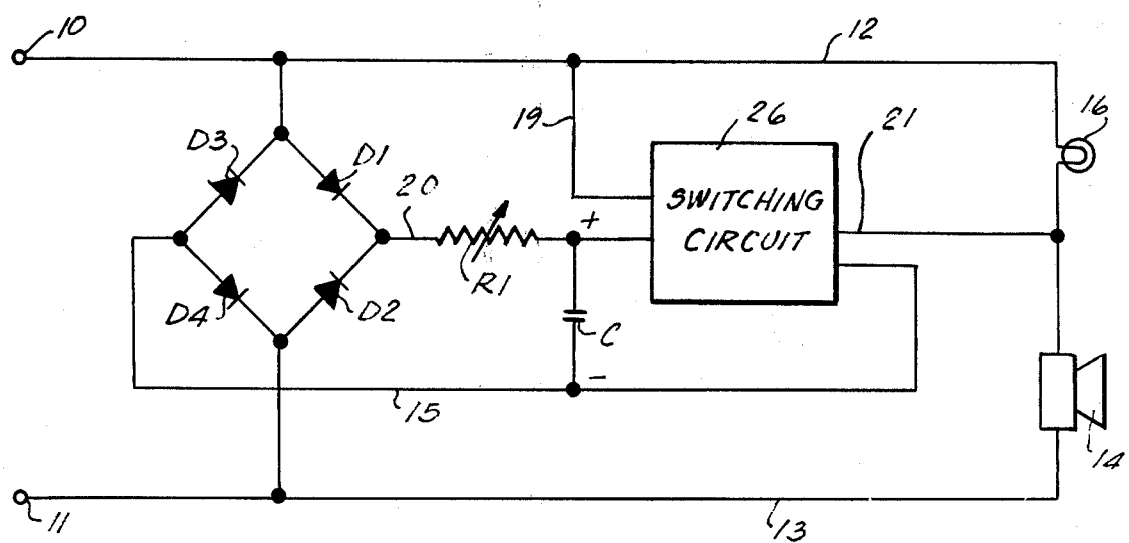
FIG. 2 illustrates a modification of the invention.

FIG. 2 is a modification of the invention wherein the reed relay coil 18, the magnetic switch 22 and the magnet 23 are replaced with a semiconductor switching circuit 26 which receives the output across the capacitor C and has input and output terminals connected to leads 19 and 21. The semiconductor switch 26 is normally closed until an overload is detected across the capacitor C at which time the switching circuit 26 opens the circuit between leads 19 and 21 thus putting the lamp 16 in series with the speaker 14 so as to protect the speaker.

Although the invention has been described with respect to preferred embodiments thereof, it is not to be so limited as changes and modifications may be made which are within the full intended scope as defined by the appended claims.

I claim as may invention:

1. An overload protective circut for a loudspeaker comprising a pair of input terminals to which an input audio signal can be applied, a resistor means connected in series with said loudspeaker across said pair of input terminals, a normally closed switch connected in parallel with said resistor means, a detector circuit connected across said input terminals wherein said detector circuit is configured to provide mre sensitivity to low frequencies which cause excursion overloads than to high frequencies which causes thermal overload, and switch actuating means connected to said detector circuit and to said normally closed switch to open it under overload conditions, wherein said resistor means comprises an incandescent lamp, wherein said switch and said switch actuating means comprise a magnetically operated reed switch and wherein said detector circuit comprises a rectifier and a smoothing circuit connected to the output of said rectifier.

2. An overload circuit according to claim 1 wherein said smoothing circuit includes a capacitor.

3. An overload circuit according to claim 2 wherein said smoothing circuit includes a resistor connected in series with said capacitor.

4. An overload circuit according to claim 1 including a fuse connected in series with said lamp across said normally closed switch.

5. An overload protective circuit for a loudspeaker comprising a pair of input terminals to which an input audio signal can be applied, a resistor means connected in series with said loudspeaker across said pair of input terminals, a normally closed switch connected in parallel with said resistor means, a detector circuit connected across said input terminals wherein said detector circuit is configured to provide more sensitivity to low frequencies which cause excursion overloads than to high frequencies which cause thermal overload, and switch actuating means connected to said detector circuit and to said normally closed switch to open it under overload conditions, wherein said resistor means comprises an incandescent lamp, wherein said switch actuating means comprises a magnetic coil magnetically coupled to said normally closed switch and said normally closed switch if formed to magnetic material, and wherein a permanent magnet is mounted adjacent said normally closed switch to bias it to the closed position.

6. An overload protective circuit for a loadspeaker comprising a pair of input terminals to which an input audio signal can be applied, a resistor means connected in series with said loudspeaker across said pair of input terminals, a normally closed switch connected in parallel with said resistor means, a detector circuit connected across said input terminals wherein said detector circuit is configured to provide more sensitivity to low frequencies which cause excursion overloads than to high frequencies which cause thermal overload, and switch actuating means connected to said detector circuit and to said normally closed switch to open it under overload conditions, wherein said switch and said switch actuating means comprise a magnetically operated reed switch, wherein said detector circuit comprises a rectifier and a smoothing circuit connected to the output of said rectifier, and wherein said smoothing circuit includes a capacitor.

* * * * *